(12) United States Patent
Burk et al.

(10) Patent No.: US 6,842,851 B2
(45) Date of Patent: Jan. 11, 2005

(54) READING A SELECTED REGISTER IN A SERIES OF COMPUTATIONAL UNITS FORMING A PROCESSING PIPELINE UPON EXPIRATION OF A TIME DELAY

(75) Inventors: Wayne Eric Burk, San Jose, CA (US); Ewa M. Kubalska, San Jose, CA (US); Brian D. Emberling, San Mateo, CA (US)

(73) Assignee: Sun Microsytems, Inc., Santa Clara, CA (US)

( * ) Notice: Subject to any disclaimer, the term of this patent is extended or adjusted under 35 U.S.C. 154(b) by 501 days.

(21) Appl. No.: 10/085,642

(22) Filed: Feb. 28, 2002

(65) Prior Publication Data

US 2003/0163676 A1 Aug. 28, 2003

(51) Int. Cl.[7] .............................................. G06F 15/00
(52) U.S. Cl. ........................ 712/225; 712/218; 711/167
(58) Field of Search ................................. 712/218, 228, 712/220, 225, 1; 711/167, 168, 169; 365/194

(56) References Cited

U.S. PATENT DOCUMENTS 6,105,123 A * 8/2000 Raje ............................ 712/24

6,567,335 B1 * 5/2003 Norman et al. .......... 365/230.06

* cited by examiner

Primary Examiner—Eddie Chan
Assistant Examiner—Tonia L. Meonske
(74) Attorney, Agent, or Firm—Meyertons Hood Kivlin Kowert & Goetzel, P.C.; Jeffrey C. Hood; Mark K. Brightwell

(57) ABSTRACT

A system and method for reading register contents from a computational pipeline having a plurality of computational units. The system includes a readback bus and a read control unit. The readback bus has a plurality of logic units coupled in a series. Each logic unit couples to a corresponding one of the computational units. The read control unit couples to each of the computational units through a corresponding load line, and is configured to assert a load signal on one of the load lines in response to a register read request. Each of the computational units is configured to transmit a data value from a selected register onto the readback bus in response to detecting an assertion of the load signal on its corresponding load line.

7 Claims, 9 Drawing Sheets

READING A SELECTED REGISTER IN A SERIES OF COMPUTATIONAL UNITS FORMING A PROCESSING PIPELINE UPON EXPIRATION OF A TIME DELAY

BACKGROUND OF THE INVENTION

1. Field of the Invention

This invention relates generally to the field of pipelined computation and, more particularly, to a system for saving the state of programmable registers in a computational pipeline.

2. Description of the Related Art

The principle of arranging multiple computational units in a series to form a pipeline is well known. Each computational unit $U_k$ in the pipeline receives input data $D_k$, performs a corresponding set of one or more operations on the data $D_k$ to obtain output data $D_{k+1}$. Computational unit $U_k$ may forward its output data $D_{k+1}$ to a next computational unit $U_{k+1}$, or, to some system external to the pipeline in the case where $U_k$ is the last computational unit in the pipeline. The first computational unit $U_0$ in the pipeline receives initial data $D_0$. The last computational unit $U_N$ in the pipeline outputs final results $D_{N+1}$. The pipeline may operate in a clocked fashion, where each computational unit $U_k$ operates on a new set of input data $D_k$ in every pipeline clock cycle.

In modem pipelines, the computational units have programmable registers that allow the functionality of the computational units to be modified. Furthermore, multiple processes may use the pipeline in a time-shared fashion. Before switching from one process to another, the values of the programmable registers in the computational units may need to be saved because the next process may use a different set of values for the programmable registers. Even in situations where the pipeline is not shared between multiple processes, there may be a variety of reasons for reading values stored in the computational pipelines. Thus, there exists a need for a system and method which efficiently provides for the reading of stored values (e.g. register values) from the computational units.

SUMMARY OF THE INVENTION

In one set of embodiments, a system for reading register values from a computational pipeline may be configured as follows. The readback system may include a readback bus and a read control unit. The readback bus may include a plurality of logic units coupled in a series. A first input of each logic unit may be coupled to a corresponding one of the pipeline units. The logic unit may include a set of parallel gates such as OR gates.

The read control unit may couple to each of the pipeline units through a corresponding load enable line. The read control unit may be configured to: (a)

(a) receive a read address;
(b) determine the pipeline unit $M_x$ which contains the register indicated by the read address;
(c) assert a load enable signal on the load enable line corresponding to the pipeline unit $M_x$.

Each pipeline unit may be configured to transmit a data value from a selected register onto the readback bus in response to detecting an assertion of the load signal on its corresponding load enable line. The data value propagates through the read bus to a read buffer which captures the data value.

The readback bus may also include a timing unit. The read control unit may load the timing unit with a time delay value $T_x$ corresponding to the length of time that pipeline unit $M_x$ takes to deliver its data to the read buffer from the assertion of the load signal. The timing unit applies a time delay equal to (or approximately equal to) time delay value $T_x$ before enabling the read buffer to capture the transmitted data value.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
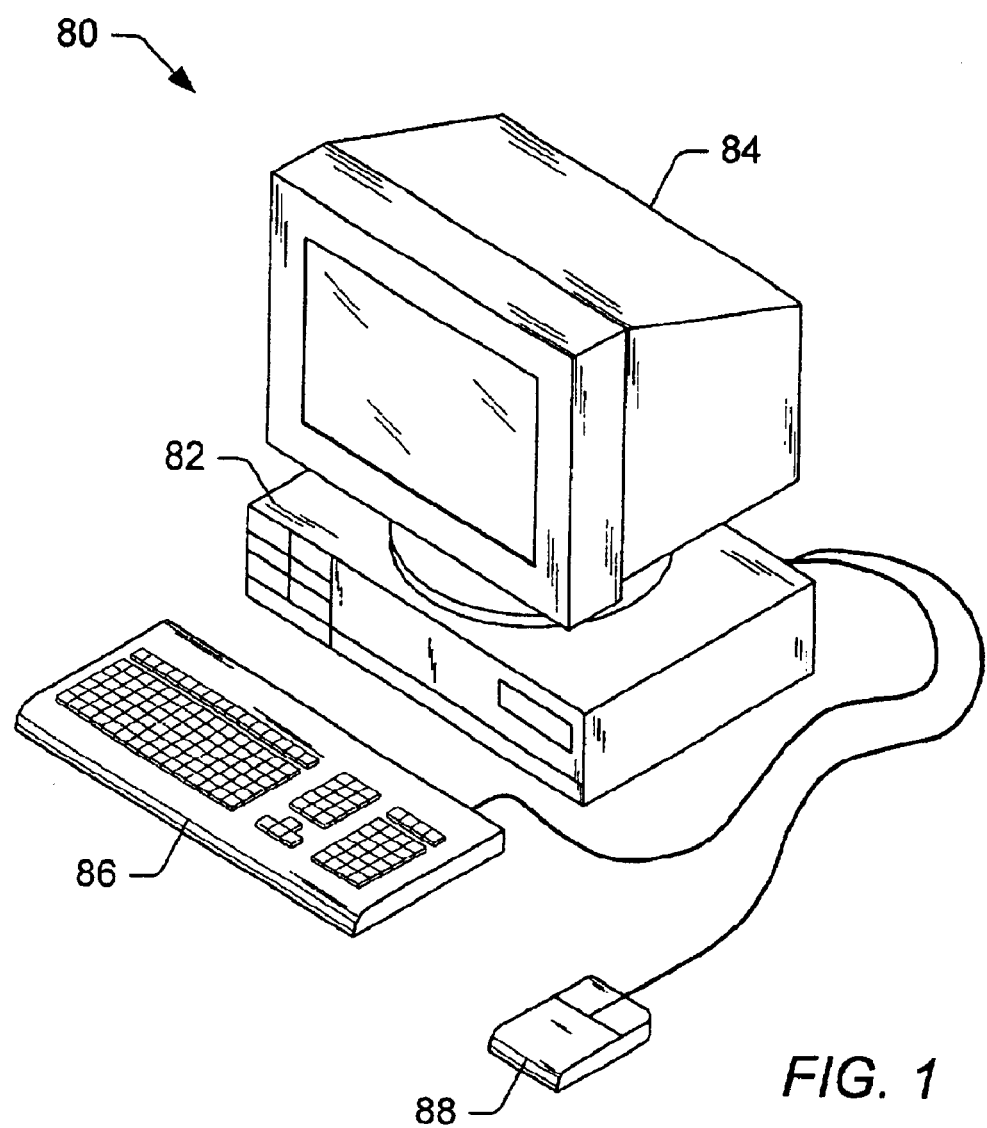
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
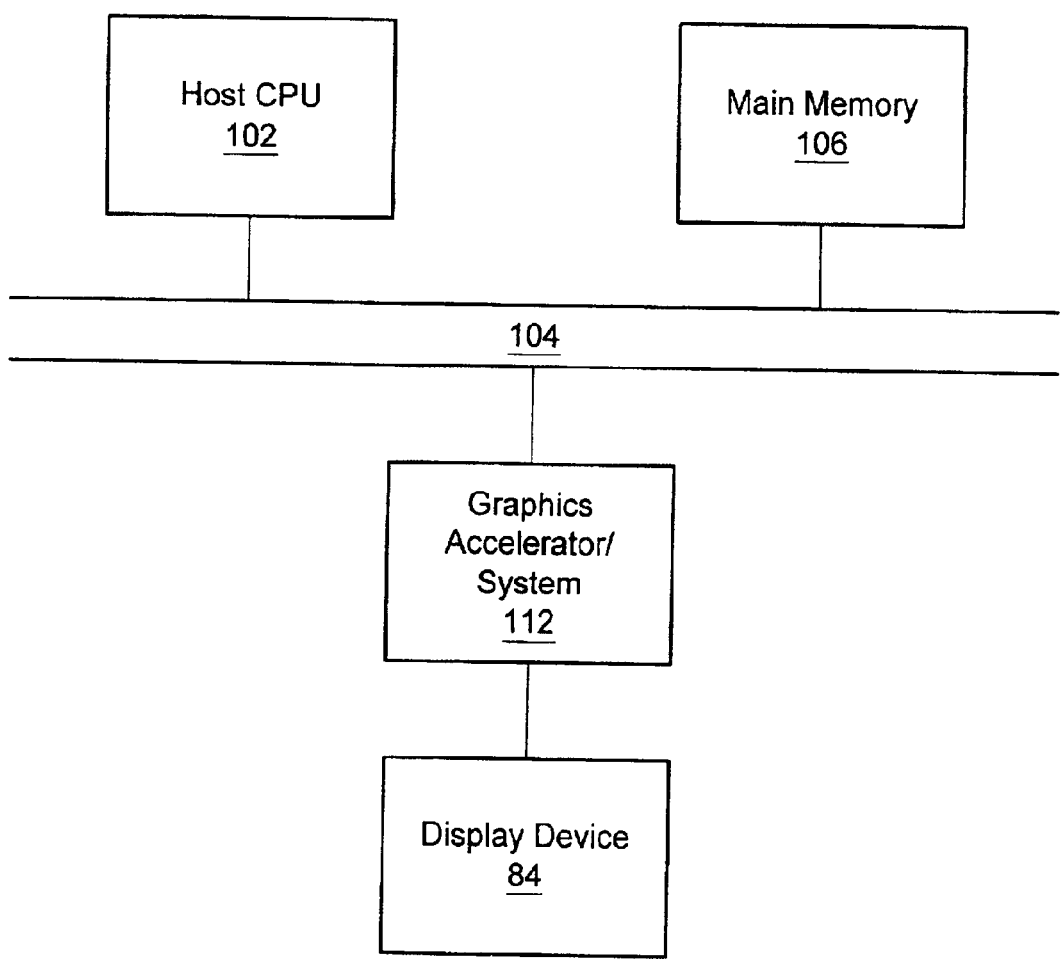
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112. Host Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
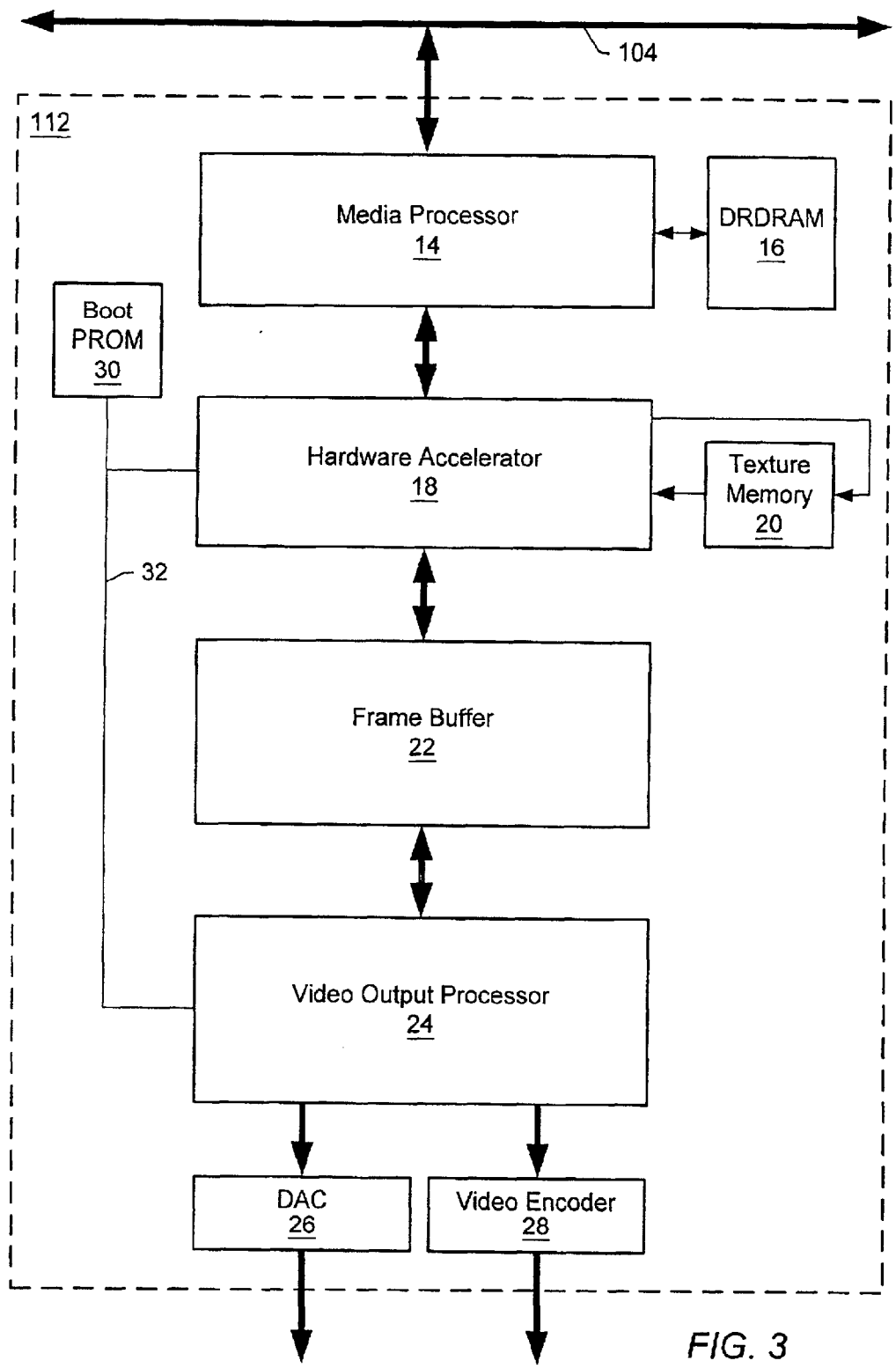
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
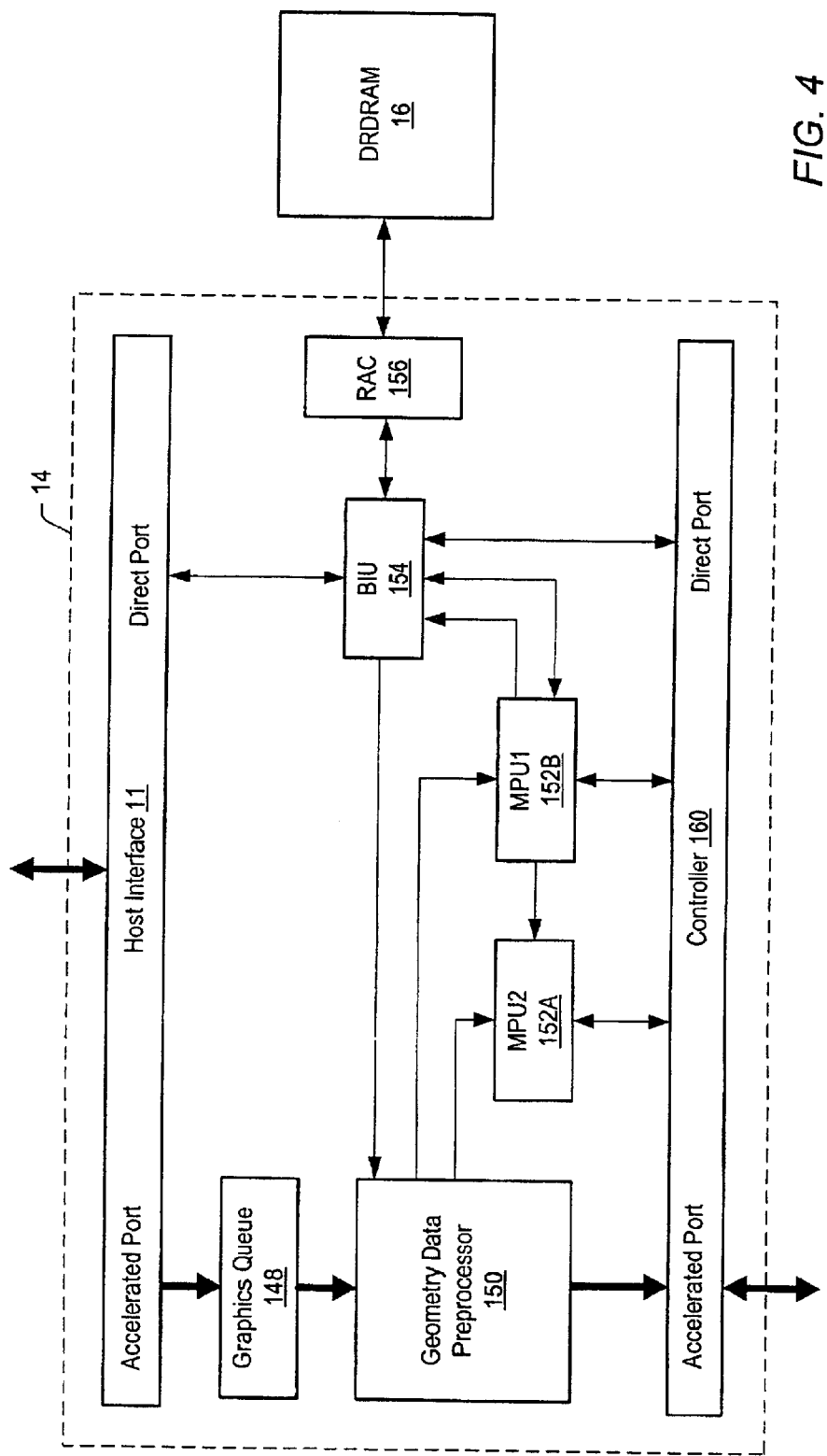
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
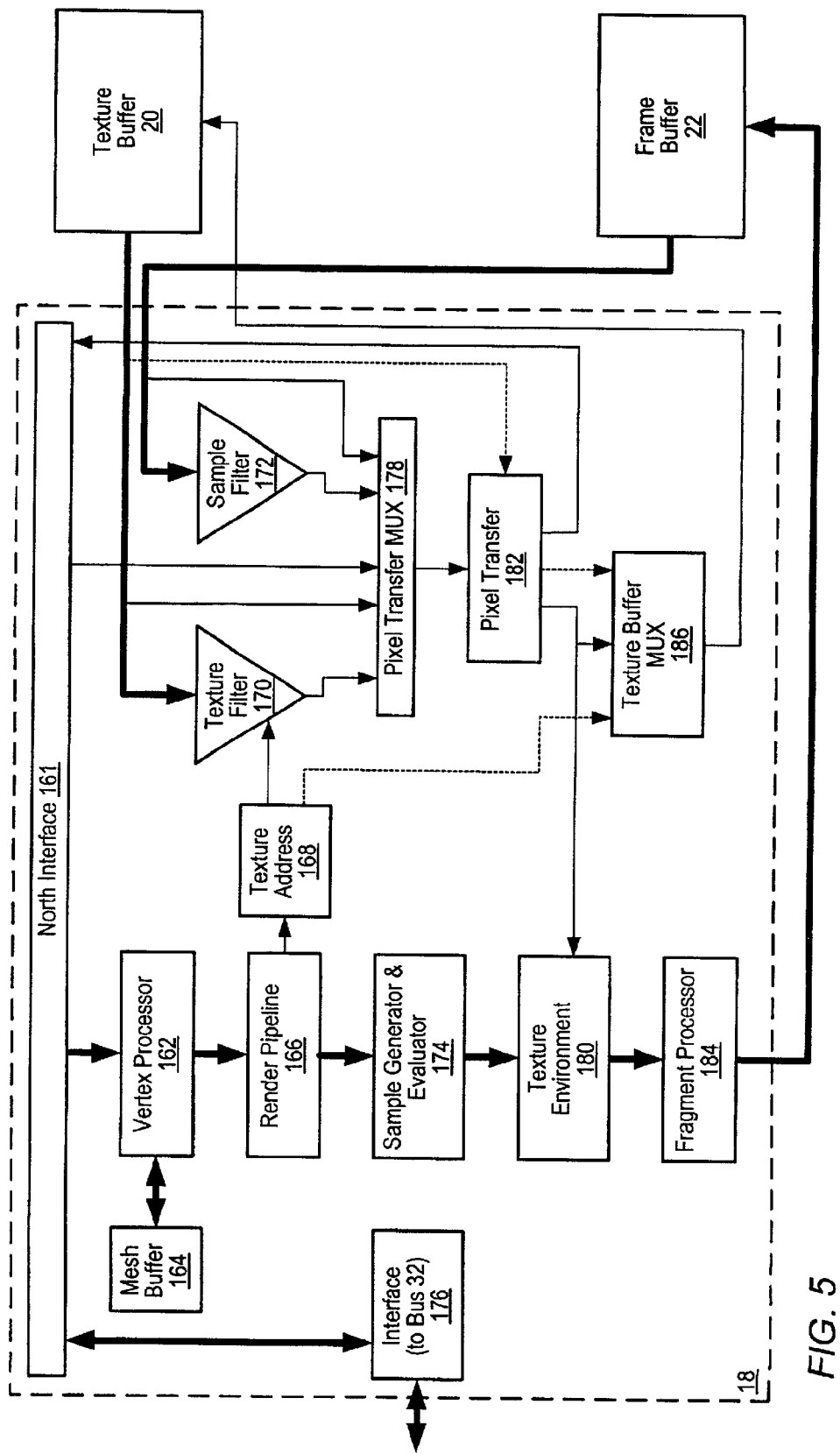
FIG. 5 is a functional block diagram of one embodiment of the hardware is accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile, resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and

S, t, r, and w (i.e. texture components).

In embodiments using super-sampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
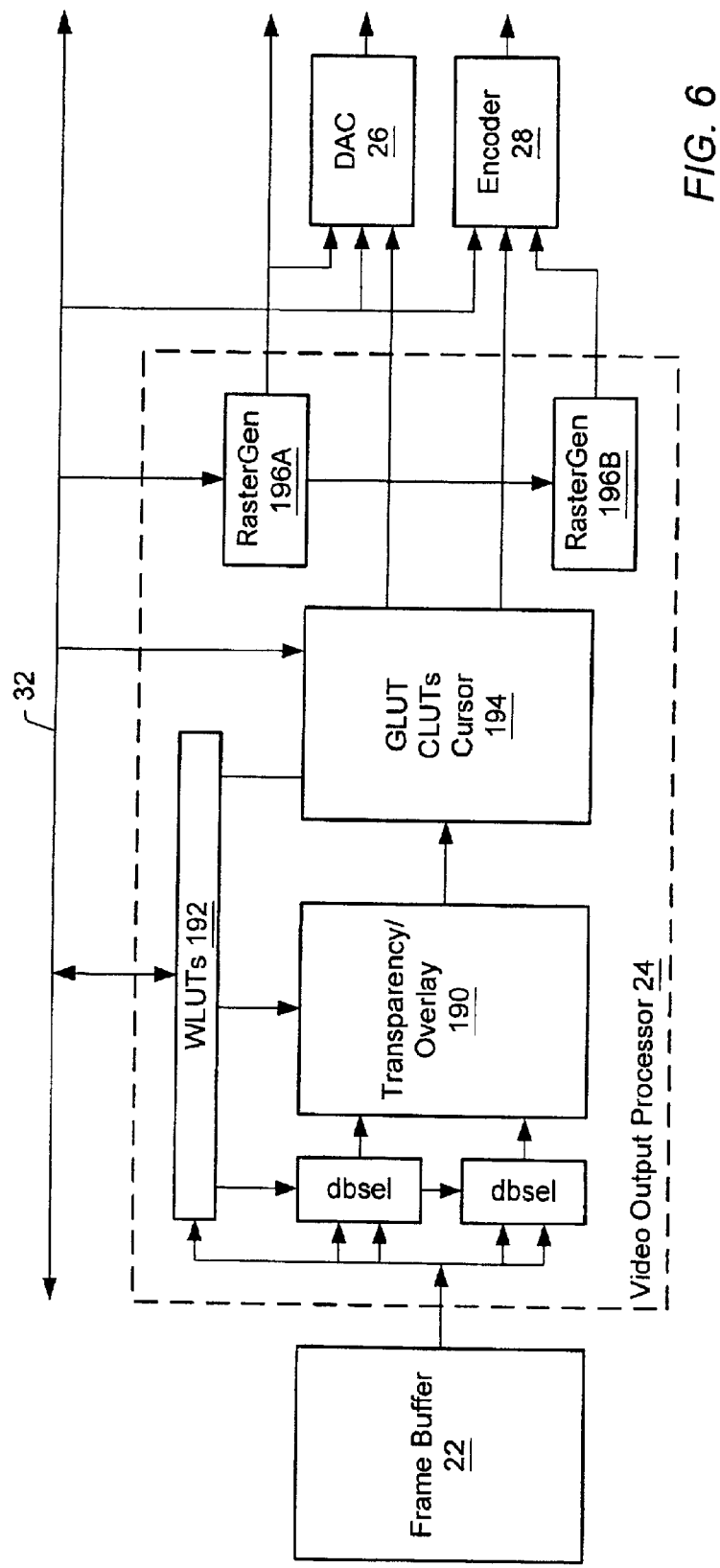
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a $1280\times10^{24}$ CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micromirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz, Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to; other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric, parameters defining primitives such as triangles from media processor 14, and render the, primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
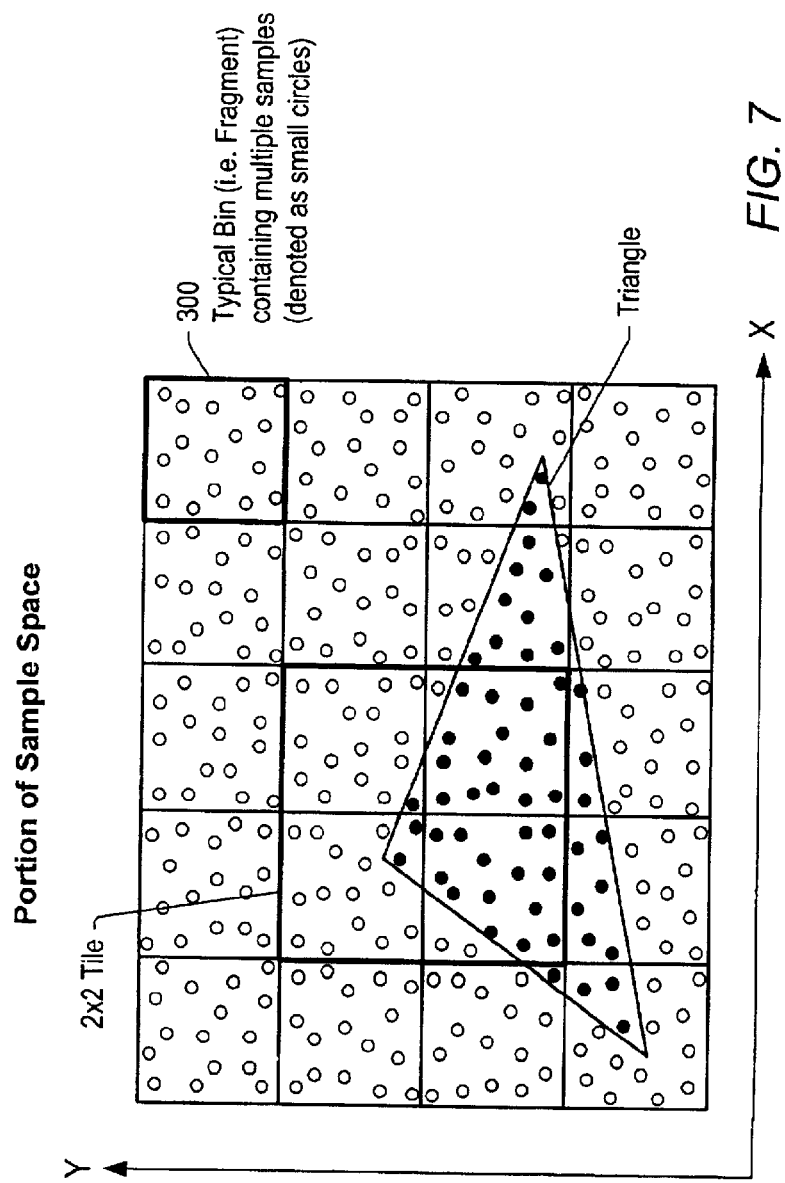
FIG. 7 illustrates a field of sample positions in a two dimensional rendering space, and a triangle superimposed on the two-dimensional rendering space.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g. bin 300) as illustrated in FIG. 7. Each bin may contain one or more samples. The number of samples per bin may be a programmable parameter.

Daisy Chain Read Back of Register Contents

Figure 8:
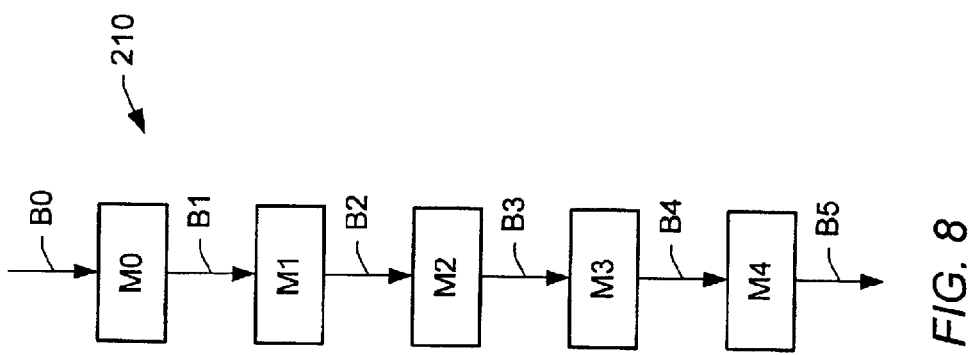
FIG. 8 illustrates one embodiment of a computational pipeline including a series of computational units.

FIG. 8 illustrates one embodiment of a computational pipeline 210. The computational pipeline 210 includes a plurality of computational units $M_0, M_1, \ldots, M_{N-1}$. N is set equal to five in the illustrated example, however, it it noted that N may take any integer value greater than or equal to two. Each computational unit $M_k$ receives input data values $D_k$ through a bus $B_k$, operates on the input data values $D_k$ to generate output data values $D_{k+1}$, and passes the output data values $D_{k+1}$ to a next unit (or a system external to the pipeline) through a bus $B_{k+1}$.

Figure 9:
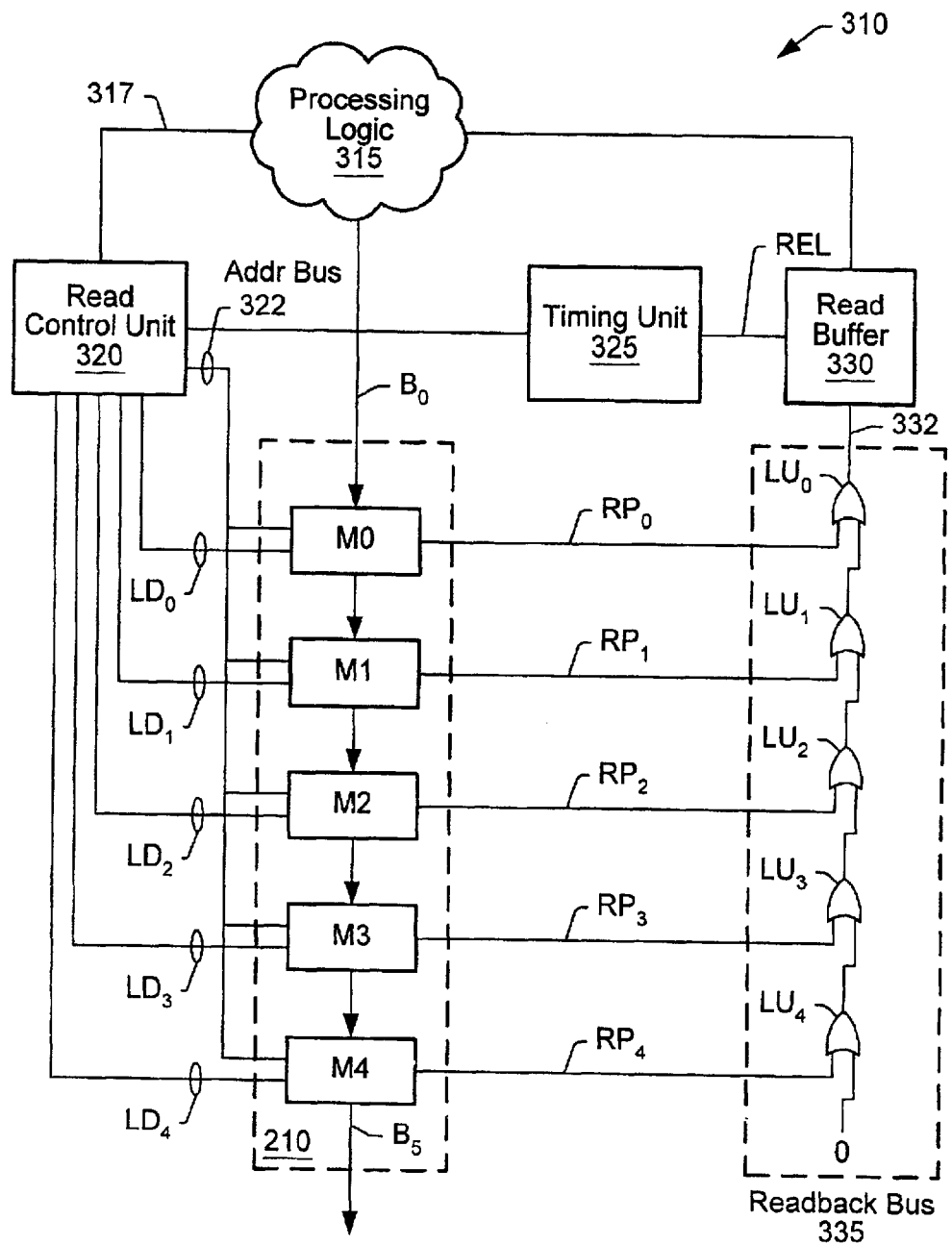
FIG. 9 illustrates one embodiment of a system for reading register values from computational units in the pipeline to a read buffer.

FIG. 9 illustrates a readback system 310 for reading register values from the computational pipeline 210. Readback system 310 includes read control unit 320, timing unit 325, read buffer 330 and readback bus 335.

Processing unit 315 provides to read control unit 320 a register read request through a bus 317. The read request specifies the address of a register to be read from one of the computational units $M_0$ through $M_{N-1}$. Read control unit 320 determines which of the computational units contains the requested register based on the register address. For example, read control unit 320 may refer to a table which indicates the range of register addresses associated with each computational unit. Read control unit 320 may perform comparisons to determine which address range the requested register address belongs to.

Read control unit 320 may couple to computational units $M_0, M_1, \ldots, M_{N-1}$ through load lines $LD_0, LD_1, \ldots, LD_{N-1}$, respectively, i.e. each computational unit may get a corresponding load line. Furthermore, read control unit 320 may couple to the computational units $M_0, M_1, M_{N-1}$ through an address bus 322.

In response to determining the computational unit $M_x$ that contains the requested register, read control unit 320 may (a) access a time delay value $T_x$ corresponding to computational unit $M_x$, (b) forward the time delay value $T_x$ to timing unit 325, (c) assert the address of the requested register on address bus 322, and (d) assert a load signal on load line $LD_x$ corresponding to computational unit $M_x$.

Each computational unit $M_k$ couples to the readbus bus 335 through a corresponding read path $RP_k$. In one embodiment, each read output path $RP_k$ may have a width $W_{RP}$ equal to the bit length of registers in the computational units. Thus, the contents of a register may be transmitted onto readback bus 335 as a single parallel transfer. In other embodiments, the width of the read output paths may be greater than or less than the register bit length.

The assertion of the load signal of load line $LD_x$ initiates a mechanism within computational unit $M_x$ that results in the data value contained in the requested register (i.e. the register specified by the address provided on address bus 322) being asserted onto the read output path $RP_x$, and thence onto readback bus 335. The data value flows up the readback bus 335 to read buffer 330, where the data value is latched.

The assertion of the load signal on load line $LD_x$ also induces the timing unit 325 to start a timing mechanism. The timing mechanism counts out an interval of time equal to the time delay value $T_x$. The time delay value $T_x$ is the amount of time it takes between (1) assertion of the load signal on load line $LD_x$ and (b) arrival of the data value from the requested register at the input port of read buffer 330. (Read control unit 320 may store a table of such time delay values. In various embodiments, the table may be organized to store time delay values for registers, groups of registers, or for computational units.) At the end of the time interval, the timing mechanism may assert a read enable signal on read enable line REL.

Readback bus 335 comprises a series of logic units $LU_0, LU_1, \ldots, LU_{N-1}$ corresponding to the computation units $M_0, M_1, \ldots, M_{N-1}$. In one set of embodiments, each logic unit $LU_k$ comprises a set of parallel OR gates. The number of OR gates in the parallel set may equal the read path width $W_{RP}$. In an alternative embodiment, each logic unit $LU_k$ may comprise a set of parallel NAND gates with inverters at the inputs of each NAND gate.

Each logic unit $LU_k$ has first and second input ports and an output port. The first input port couples a corresponding computational unit $M_k$ through the read path $RP_k$. The second input port generally couples to the output port of logic unit $LU_{k+1}$. However, the last logic unit $LU_{N-1}$ has its second input port coupled to zero (i.e. the word comprising all zeros).

The output of logic unit $LU_k$ generally couples to the second input port of logic unit $LU_{k-1}$. However, the output of first logic unit $LU_0$ couples to read buffer 330.

Each computational unit $M_k$ asserts the zero word on its read output path $RP_k$ unless it has been enabled by the assertion of the load signal on its load line $LD_k$. Thus, at most one of the computational units $M_0, M_1, \ldots, M_{N-1}$, is allowed to assert data onto the readback bus 335 at any given time. The logical OR of data value X with one or more zero words equals X. Thus, the data injected onto the readback bus 335 by the selected computational unit flows through the readback bus 335 and arrives at read buffer 330 uncorrupted.

In one alternative embodiment, each logic unit $LU_k$ may comprise a parallel set of AND gates. Each computational unit $M_k$ may assert the word of all ones on its read output path $RP_k$ unless it has been enabled by the assertion of the load signal on its load line $LD_k$. The enabled computational unit asserts its data word Y onto the corresponding read output path. The logical AND of data word Y with one or more "one words" (having all bits set to one) equals Y. Thus, the data injected onto the readback bus 335 by the enabled computational unit flows through the readback bus 335 and arrives at read buffer 330 unmodified.

Readback buffer 330 grabs a data value from it input port 332 in response to each assertion of the read enable signal on read enable line REL. Readback buffer 330 may have sufficient capacity to buffer a number $N_{Buff}$ of data values. The capacity $N_{Buff}$ may take any of a variety of positive integer values.

Processing logic 315 may send a stream of read requests to read control unit 320 to induce the transfer of data values from any or all of the registers in any or all of the computational units $M_0, M_1, \ldots, M_{N-1}$, to read buffer 330. Read buffer 330 may forward data values to processing logic 315.

In some embodiments, the logic unit $LU_k$ may be incorporated into the corresponding computational unit $M_k$.

Readback system 310 may be useable to read back register values from any of various types of computational pipelines. In other words, readback system 310 is not limited to use with computational pipelines in graphics systems.

In one set of embodiments, hardware accelerator 18 includes one or more computational pipelines such as pipeline 210. Hardware accelerator 18 may use a readback system such as readback system 310 for any or all of its one or more computational pipelines.

Figure 10:
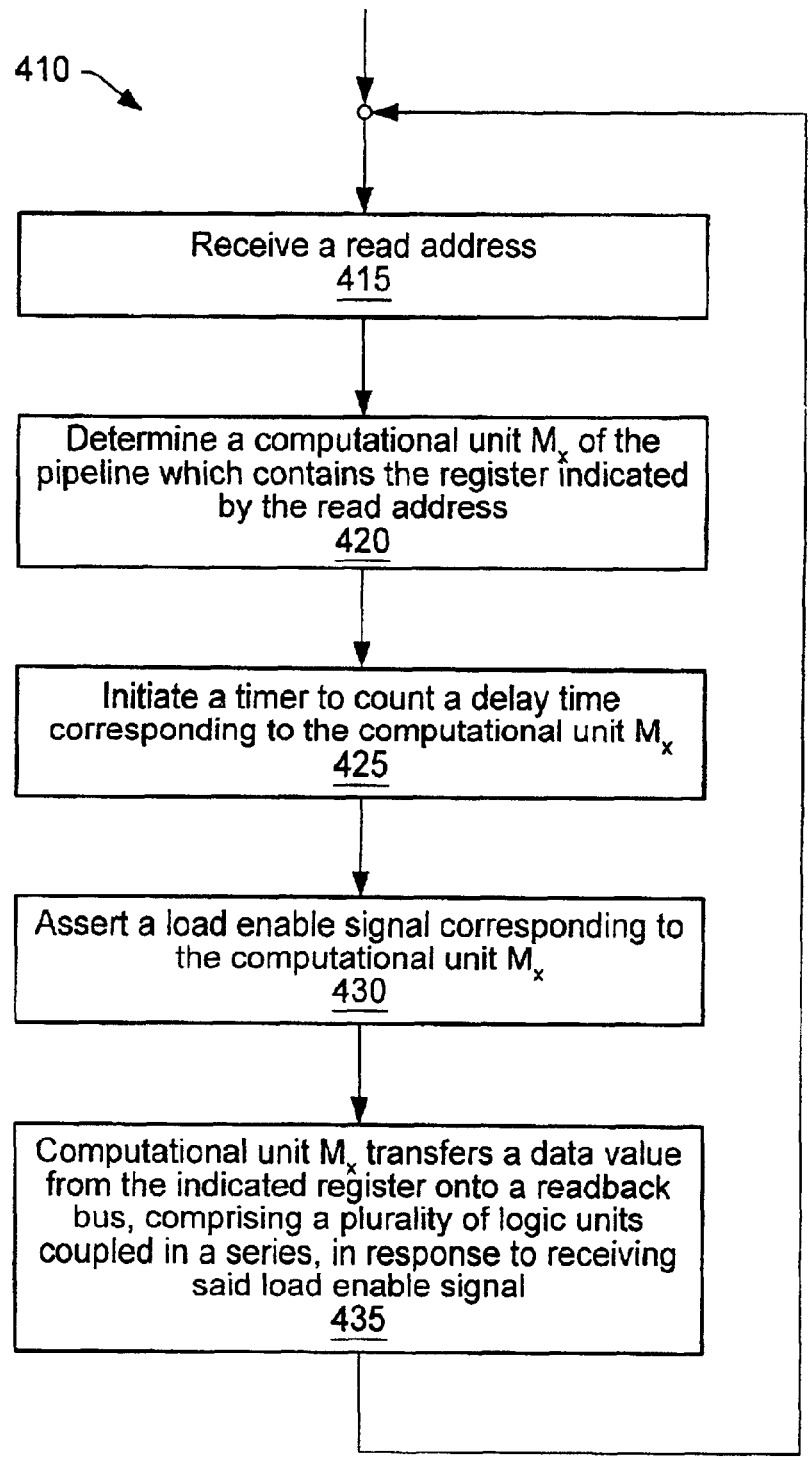
FIG. 10 illustrates one embodiment of method for reading register values from a computational pipeline.

FIG. 10 illustrates one embodiment of a method for reading register values from a pipeline such as computational pipeline 210. In step 415, a controlling agent such as read control unit 320 may receive a read address.

In step 420, the controlling agent may determine the computational unit $M_x$ of the pipeline which contains the register indicated by the read address.

In step 425, the controlling agent may initiate a timer to count a delay time corresponding to the computational unit Mx.

In step 430, the controlling agent may assert a load enable signal corresponding to the computational unit $M_x$.

In step 435, the computational unit $M_x$ may transfer a data value from the indicated register onto a readback bus in response to receiving the load enable signal. The readback bus may include a plurality of logic units coupled in a series.

A read buffer reads the data value from the readback bus in response to a read enable signal asserted by the timer upon the expiration of the delay time.

Steps 415 through 435 may be repeated as many times as necessary in order to store the contents of a collection of the pipeline registers.

In the embodiments described above, the length of the readback bus 335 equals the length N of the computational pipeline. In other embodiments, the readback bus 335 may service only a subset of the computational units in the computational pipeline. Thus, the readback bus 335 may have a length M smaller than N.

In one set of embodiments, two or more subsets of the computational units in a computational pipeline may each be serviced by a corresponding readback bus, read control unit, timing unit and read buffer. The two or more readback busses may operate in parallel. Thus, the processing logic 315 may read registers from the two or more subsets of computational units in parallel. For example, in a pipeline with 16 computational units, the first eight computational units may be serviced by a first readback bus with eight logic units, and the last eight computational units may be serviced by a second readback bus with eight logic units.

Note that the maximum time delay associated with a readback bus comprising logic units $LU_0, LU_1, \ldots, LU_{k-1}$ coupled in series depends on the number K. If the maximum time delay for a readback bus having length K is too large for a given application, the readback bus may be replaced with two or more smaller readback busses having lengths $K_1, K_2, \ldots, K_v$ respectively with $K_1+K_2+\ldots+K_v=K$. The values V and $K_1, K_2, \ldots, K_v$ may be chosen so that the maximum delay in each readback bus is acceptable.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section used herein are for organizational purposes only and are not meant to limit the description provided herein or the claims attached hereto.

What is claimed is:

1. A method for reading registers contained in a series of computational units forming a processing pipeline, the method comprising:

(a) receiving a read address pointing to one of said registers;

(b) determining a first computational unit of said series which contains said one register based on said read address;

(c) initiating a timer to count a first delay time corresponding to said first computational unit;

(d) asserting a load enable signal corresponding to said first computational unit;

(e) said first computational unit transferring first data from said one register specified by said register address onto a read data bus in response to receiving said load enable signal, wherein the read data bus comprises a series of logic units;

(f) reading said first data from the read data bus in response to a read enable signal asserted by the timer upon the expiration of the first delay time.

2. The method of claim 1, wherein each of said logic unit comprises a set of parallel gates.

3. The method of claim 2, wherein said gates are OR gates.

4. The method of claim 1 further comprising repeating (a) through (f) for each register in a subset of said registers contained in said series of computational units.

5. A system comprising:

a series of computational units forming a computational pipeline, wherein the series of computational units contain a plurality of registers;

a readback bus comprising a plurality of logic units coupled in a series, wherein a first input of each logic unit is coupled to a corresponding one of the computational units;

a timing unit;

a read buffer coupled to an output of the readback bus;

a read control unit coupled to each of the computational units through a corresponding load enable line, wherein the read control unit is configured to (a) receive a read address pointing to one of said registers, (b) determine a first computational unit of said series which contains said one register based on said read address, (c) initiate the timing unit to count a first delay time corresponding to said first computational unit, (d) assert a load enable signal on the load enable line corresponding to said first computational unit;

wherein the first computational unit is configured to transfer first data from said one register onto the read data bus in response to receiving said load enable signal;

wherein the timing unit is configured to assert a read enable signal upon expiration of the first delay timer;

wherein the read buffer is configured to capture said first data from the output of the read data bus in response to the read enable signal.

6. The system of claim 5, wherein the logic unit comprises a parallel set of logic gates.

7. The system of claim 6, wherein the logic gates are OR gates.

* * * * *